United States Patent [19]

Lake

[11] 4,236,673
[45] Dec. 2, 1980

[54] PORTABLE POWER OPERATED CHEMICAL SPRAY APPARATUS

[76] Inventor: Steven R. Lake, R.R. 3, Earlville, Ill. 60518

[21] Appl. No.: 71,779

[22] Filed: Aug. 31, 1979

[51] Int. Cl.³ ............................................. E01H 11/00
[52] U.S. Cl. ..................................... 239/172; 239/375
[58] Field of Search ............... 239/375, 149, 172, 302, 239/590, 152, 154, 146; 222/465–467

[56] References Cited

U.S. PATENT DOCUMENTS

| | | | |
|---|---|---|---|
| 918,931 | 4/1909 | Thurman | 239/375 X |
| 3,136,487 | 6/1964 | Halaby | 239/149 X |

Primary Examiner—Richard A. Schacher
Attorney, Agent, or Firm—Morsbach & Pillote

[57] ABSTRACT

A portable power operated spray apparatus in which a generally cylindrical tank is supported on a saddle including a flat base and upstanding end plates shaped to receive the cylindrical side wall of the tank. Straps are welded to the end plates and extend around the tank and have upturned ends at the top of the tank spaced apart and connected by a tie bolt to provide carrying handles for the spray apparatus. An electric motor-pump unit is mounted on the base below the tank and arranged to be operated from a vehicle electrical power system to deliver chemicals from the tank through a flexible hose to a spray head.

3 Claims, 4 Drawing Figures

U.S. Patent  Dec. 2, 1980  4,236,673
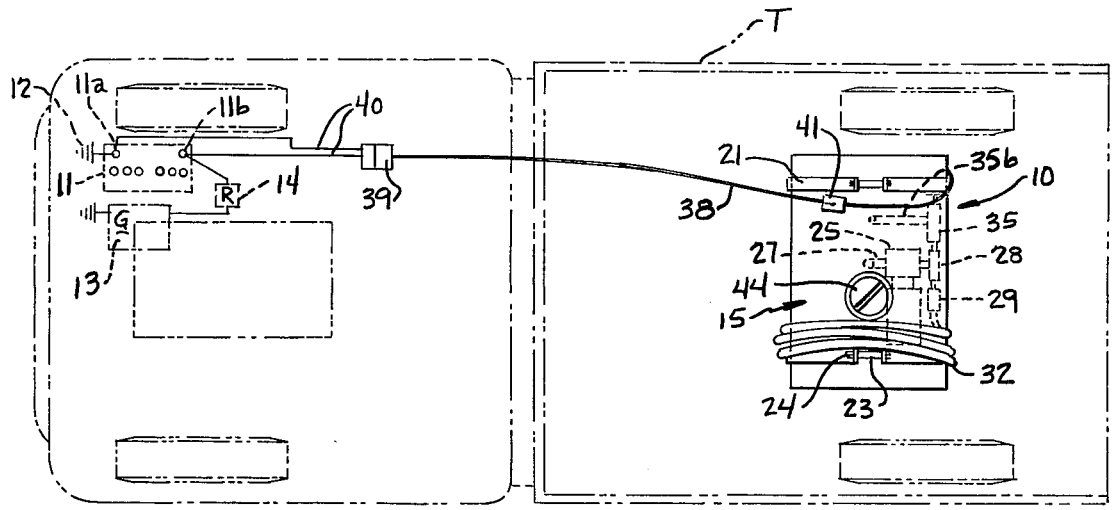
Fig. 1.
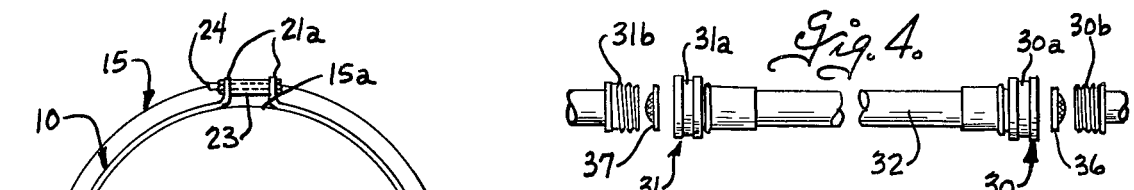
Fig. 4.
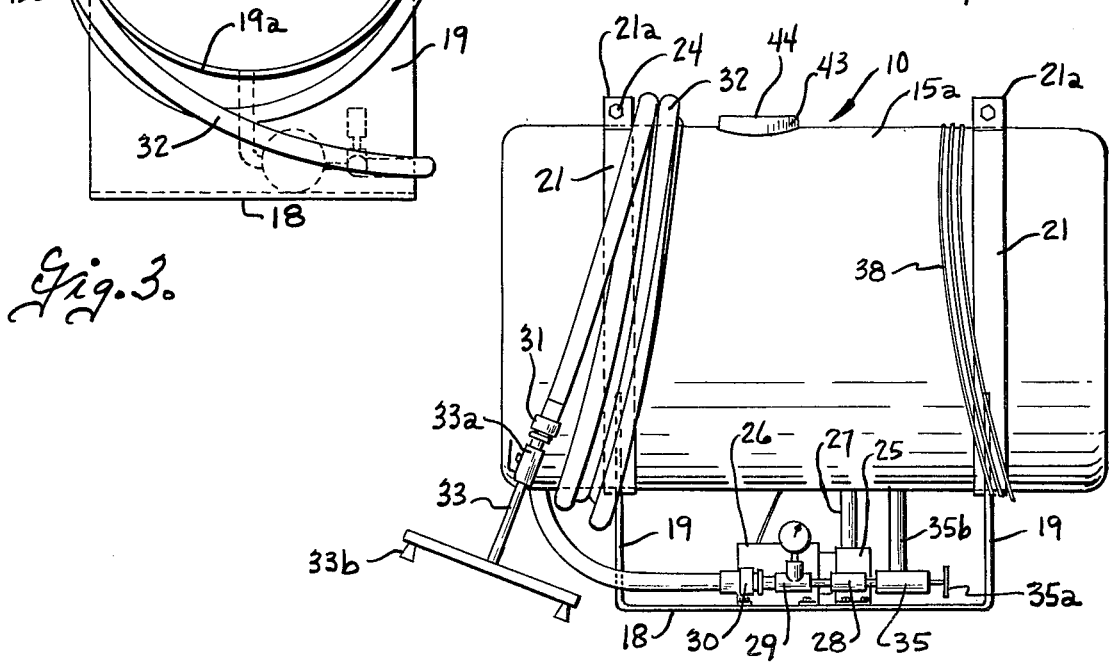
Fig. 3.
Fig. 2.

PORTABLE POWER OPERATED CHEMICAL SPRAY APPARATUS

BACKGROUND OF THE INVENTION

The present invention relates to power operated chemical spray apparatus for use with motor vehicles of the type having a vehicle electrical power system, for spraying chemicals such as herbicides and/or pesticides along fence rows and roadways, lawns, shrubbery and the like.

An important object of this invention is to provide a portable power operated chemical spray apparatus including a tank, pump, and pump-drive motor and having an improved arrangement for mounting the tank on a base to provide carrying handles for the spray apparatus and for mounting the pump and pump-drive motor on the base and below the tank to be protectively enclosed by the base and tank during shipment and use.

Another object of this invention is to provide a portable power operated chemical spray apparatus for use with motor vehicles which is so constructed and arranged that it can be readily lifted by one man onto and off of a motor vehicle and which is economical to make and simple to operate.

Still another object of this invention is to provide a portable power operated chemical spray apparatus having an improved filter arrangement that can be easily cleaned in the field.

Accordingly the present invention provides a portable power operated chemical spray apparatus for use with a motor vehicle having a vehicle electrical power system. the spray apparatus comprising a generally cylindrical supply tank, a tank cradle including a generally flat base having a length less than the length of the tank and upstanding end plates adjacent opposite ends of the base, each end plate having a concave upper edge shaped to receive the cylindrical side wall of the tank, a pair of generally circular metal straps each secured to the upper edge of a respective one of end plates, each strap extending around the cylindrical side wall of the tank inwardly of the ends of the tank and having upturned end portions adjacent the tops of the tank spaced apart a distance sufficient to receive a hand therebetween, strap end connector means extend between the upturned end portions of each strap at a position spaced above the tank for interconnecting the upturned end portions on each strap in spaced relation to each other and providing a handle therebetween, a pump having an electric drive motor mounted on the base between the end plates and adjacent the underside of the tank, means connecting the pump inlet to the tank, an elongated flexible spray hose having one end connected to the pump outlet, a spray head means connected to the other end of the hose, and means for electrically connecting the electric drive motor to the vehicle electrical power system for energization thereby.

These, together with other objects, features and advantages of this invention will be more readily understood by reference to the following detailed description, when taken in connection with the accompanying drawings, wherein:

FIG. 1 is a diagrammatic plan view illustrating the portable power operated spray apparatus mounted on a motor vehicle;

FIG. 2 is a side elevational view of the spray apparatus;

FIG. 3 is an end elevational view of the spray apparatus; and

FIG. 4 is a fragmentary view of the spray base and end connectors.

The portable power operated chemical spray apparatus designated generally by the numeral 10 is adapted for use with a motor vehicle such as a pick-up truck T for transportation by the vehicle and for energization from the vehicle electrical power system. As is conventional, the vehicle power system includes the usual battery 11 having terminals 11a and 11b, one of which is connected to the vehicle ground indicated 12. A generator 13 driven from the vehicle engine is connected through a voltage regulator 14 to one of the other terminals 11b of the battery to supply power for the various vehicle accessories and to recharge the battery.

The portable power operated spray apparatus includes a tank 15 having a cylindrical side wall 15a and end walls 15b. The tank can be formed of any suitable material such as metal or plastic and may be formed in different sizes, for example in the range of 20 to 100 gallons.

The tank is supported on a saddle which includes a generally flat base plate 18 having a length less than the length of the tank and upstanding end plates 19 adjacent opposite ends of the base plate and each having a concave upper edge 19a shaped to receive the cylindrical side wall of the tank. The cradle can be economically formed from one piece metal plate stock by cutting or otherwise shaping the concave edges 19a and then bending the end plates 19 upwardly relative to the base plate 18. A pair of generally circular metal straps 21 are each secured as by welding to the upper edge of the respective one of the end plates and each strap extends around the cylindrical side wall of the tank at a location inwardly of the ends of the tank and has upturned end portions 21a adjacent the top of the tank that are spaced apart a distance sufficient to receive a human hand therebetween. The upturned end portions of each strap are interconnected by strap end connectors which join the ends of the strap and also form a handle between the upturned end portions to facilitate lifting and handling of the spray apparatus. As shown, each strap end connector includes a tubular handle member 23 disposed between the upturned end portions 21a on each strap, and a tie bolt 24 that extends through openings in the strap end portions 21a and through the tubular handle member 23 to interconnect the ends of the strap. The tie bolt and handle member 23 are spaced above the tank a distance sufficient to allow the fingers on the user's hand to extend between the handle portion and the tank.

The end plates 19 and straps 21 support the tank spaced above the base plate 18 and a pump 25 having an electric drive motor 26 is mounted on the upper side of the base plate 18 between the end plates 19 and adjacent the underside of the tank. As will be seen from FIGS. 1–3, the motor-pump unit is located inwardly of the periphery of the base plate so as to be protectedly enclosed between the base plate and tank. The pump 25 has a pump inlet connected through an inlet line 27 to the tank adjacent the bottom of the tank, and a pump outlet connected to a T-fitting 28. One end of the T-fitting 28 is connected through a pressure guage 29 and hose coupling 30 to one end of an elongated flexible hose 32. A spray head 33 is connected through a hose coupling 31 to the other end of the flexible hose for spraying the chemicals such as herbicides and pesticides. The spray head can be of any suitable construction and may, for example, be either a hand gun type spray head or a spray bar. As diagrammatically shown in FIG. 1, the spray head includes one or more nozzles 33b and a hand operable valve 33a for controlling flow of the chemicals from the hose to the nozzle.

A pressure regulator 35 is connected to the other end of the T-fitting 28 and is adjustable as by a hand knob 35a to regulate the pressure delivered by the pump to the hose 32. The regulator has a by-pass return line 35b which is connected to the tank 15 at a location preferably spaced from the connection of the pump inlet tube 27, so that the liquid by-passed through the pressure regulator back to the tank will aid in agitating and mixing the chemicals in the tank.

The electric pump drive motor 26 is connected to the vehicle electrical power system for energization thereby. For this purpose, a low voltage power cable 38 (FIG. 1) is connected to the electric drive motor 26 and has a pair of conductors adapted for connection, for example, to an electrical plug type disconnect 39 that is connected through conductors 40 to the terminals 11a and 11b of the battery. An on/off switch 41 (FIG. 1) is conveniently provided in the cable 38 at a location adjacent the spray apparatus 10 to facilitate starting and stopping of the pump.

The tank has a filler opening 43 at its top and a removable cover 44 to facilitate introduction of the chemicals and the liquid into the tank.

In order to minimize clogging of the spray nozzles by incompletely dissolved chemicals or other foreign material in the liquid to be sprayed, it is common practice to provide a cannister type strainer either in the inlet line 27 or in the line leading from the pump outlet. Sucn canister type strainers significantly increase the cost of the spray apparatus and are difficult to clean in the field without releasing some contaminants that could pass to the spray nozzles and clog the latter. In accordance with another feature of the present invention, strainer screens are provided in hose couplings at the ends of the spray hose and the spray hose couplings are arranged so that the spray hose can be reversibly connected for flushing the strainer screens. As best shown in FIG. 4, the hose couplings 30 and 31 are arranged so that like female coupling members 30a and 31a are provided on opposite ends of the hose to mate with like male coupling members 30b and 31b respectively connected to the pressure gauge 29 and the spray head 33. Strainer screens 36 and 37 are provided in the female hose couplings 30 and 31 respectively. When the strainer screen 36 in the hose coupling 30a at the inlet end of the spray hose becomes clogged, it can be readily cleaned in the field by first disconnecting the female coupling members 30a and 31 a; then reconnecting the female coupling 31a and filter screen 37 that was formerly at the outlet end of the hose to the male coupling 30b; thereafter operating the pump for a short interval to pump liquid through the hose and flush the clogged strainer screen 36, and finally reconnecting the spray head 33 to the female hose coupling member that is now at the outlet end of the hose.

From the foregoing it is thought that the construction and use of the portable power operated spray apparatus will be readily understood. The base plate 18 and end plates 19 form a light weight saddle for the tank 15 and the straps 21 not only secure the tank to the saddle but also provide handles which facilitate lifting of the spray apparatus. The pump 25 with the electric drive motor 26 is light weight and compact and is mounted on the upper side of the base plate 18 at a location inwardly of the margin of the base plate so that it is protectively shielded during shipment and use. The flexible hose 32 can be wrapped around one end of the tank as shown in FIGS. 2 and 3 when not in use, and the upturned end portions 21a of the straps and handle 23 form a retainer to retain the coiled hose on the end of the tank. Similarly, the power cable 38 can be coiled around the other end of the tank as shown in FIG. 2 and the upturned end portions on the other strap 21 provides a retainer to hold the coiled cable on the end of the tank. The portable power operated spray apparatus, when not filled with liquid, is relatively light in weight and can be easily lifted by one man using the handles 23 to move it onto and off of the automotive vehicle. In order to operate the spray apparatus, it is only necessary to connect the power cable 38 through the connector 39 to the vehicle electrical power system. When the switch 41 is turned on, the pump is energized and the chemicals such as herbicides or pesticides can then be dispensed through the spray head 33. As previously described, the spray head can be either a hand gun or a spray bar that can be attached to the vehicle to deliver the chemicals in a spray pattern alongside the path of the travel of the vehicle. When the strainer screen at the inlet end of the hose becomes clogged it can be flushed by reversing the hose connections to the male coupling 30b and operating the pump for a short interval to clean the strainer screen before reconnecting the spray head to the outlet end of the hose.

The embodiments of the invention in which an exclusive property or privilege is claimed are defined as follows:

1. A portable power operated chemical spray apparatus for use with a motor vehicle having a vehicle electrical power system, the spray apparatus comprising a generally cylindrical supply tank, a tank cradle including a generally flat base plate having a length less than the length of the tank and upstanding end plates adjacent opposite ends of the base plate each having a concave upper edge shaped to receive the cylindrical side wall of the tank, a pair of generally circular metal straps each secured to the upper edge of a respective one of the end plates, each strap extending around the cylindrical side wall of the tank at locations spaced inwardly of the ends of the tank and having upturned end portions adjacent the top of the tank spaced apart a distance sufficient to receive a hand therebetween, strap end connector means extending between the upturned end portions of each strap at a position spaced above the tank for interconnecting the upturned end portions on each strap in spaced relation to each other and providing handle therebetween, a pump having an electric drive motor mounted on the upper side of said base plate inwardly of the periphery thereof and adjacent the underside of the tank and having a pump inlet and a pump outlet, means connecting the pump inlet to the tank, an elongated flexible spray hose, first hose connector means connecting one end of the spray hose to the pump outlet, a spray head means and second hose connector means connecting the other end of the hose to the spray head, and means for electrically connecting the electric drive motor to the vehicle electrical pump system for energization thereby.

2. A portable spray apparatus according to claim 1 wherein said strap end connector means includes a tubular handle member disposed between the upright end portions of each strap and tie bolts each extending through the upright end portions on a respective one of the straps and through the tubular handle member disposed therebetween.

3. A portable spray apparatus according to claim 1 wherein said first and second hose connector means includes first and second like female hose coupling members at opposite ends of the spray hose, a first male hose coupling member connected to the pump outlet and a second male coupling member connected to the spray head means, and first and second filter screens in the first and second female hose coupling members whereby the hose can be reversibly connected to the pump outlet for cleaning the screens.

* * * * *